United States Patent
Li et al.

(10) Patent No.: US 11,662,598 B2
(45) Date of Patent: May 30, 2023

(54) BEAM COHERENCE ELIMINATING ELEMENT

(71) Applicant: SHANGHAI FEIBO LASER TECHNOLOGIES CO., LTD., Shanghai (CN)

(72) Inventors: Xiaojun Li, Shanghai (CN); Wentao Li, Shanghai (CN); Jie Wu, Shanghai (CN)

(73) Assignee: SHANGHAI FEIBO LASER TECHNOLOGIES CO., LTD., Shanghai (CN)

( * ) Notice: Subject to any disclaimer, the term of this patent is extended or adjusted under 35 U.S.C. 154(b) by 364 days.

(21) Appl. No.: 16/769,935

(22) PCT Filed: Nov. 27, 2018

(86) PCT No.: PCT/CN2018/117696
§ 371 (c)(1),
(2) Date: Jun. 4, 2020

(87) PCT Pub. No.: WO2019/109836
PCT Pub. Date: Jun. 13, 2019

(65) Prior Publication Data
US 2020/0310147 A1    Oct. 1, 2020

(30) Foreign Application Priority Data

Dec. 4, 2017  (CN) .......................... 201711260758.9

(51) Int. Cl.
*G02B 27/48* (2006.01)
*G02B 5/02* (2006.01)
(Continued)

(52) U.S. Cl.
CPC .............. *G02B 27/48* (2013.01); *C03B 25/00* (2013.01); *C03B 32/02* (2013.01); *C03B 37/025* (2013.01);
(Continued)

(58) Field of Classification Search
CPC .... G02B 27/48; G02B 5/0242; G02B 5/1871; G02B 5/3083; G02B 6/12009; G02B 27/0087; C03B 32/02; G02F 1/00
See application file for complete search history.

(56) References Cited

U.S. PATENT DOCUMENTS

| 2007/0153235 A1* | 7/2007 | Morikawa ............ G03B 21/006 353/20 |
| 2009/0093356 A1 | 4/2009 | Yamamoto |
| 2016/0225963 A1 | 8/2016 | Yoshimura et al. |

FOREIGN PATENT DOCUMENTS

| CN | 87202450 U | 12/1987 |
| CN | 101782667 A | 7/2010 |

(Continued)

OTHER PUBLICATIONS

International Search Report and Written Opinion (In English and Chinese) issued in PCT/CN2018/117696, dated Feb. 22, 2019, 12 pages provided.

(Continued)

*Primary Examiner* — Ryan D Howard
(74) *Attorney, Agent, or Firm* — Hamre, Schumann, Mueller & Larson, P.C.

(57) ABSTRACT

Disclosed in the present invention is a beam coherence eliminating element. The optical medium material of the element comprises microcrystalline glass, wherein microcrystalline particles therein have a size of 0.1-1000 nm and are distributed randomly. As the crystals in the microcrystalline glass can change the phase of light beams, the microcrystalline glass can change the phase of the light (Continued)

beams randomly, thereby eliminating the coherence of the beams. The crystal size of the microcrystalline glass is small, and thus does not affect the transmission efficiency of light beams. The element of the present invention has a simple structure and is convenient to use, and can be added in the process of beam transmission to easily eliminate beam coherence.

17 Claims, 2 Drawing Sheets

(51) Int. Cl.
  *C03B 25/00* (2006.01)
  *C03B 32/02* (2006.01)
  *C03B 37/025* (2006.01)
  *G03B 21/20* (2006.01)

(52) U.S. Cl.
  CPC ....... *G03B 21/208* (2013.01); *G03B 21/2013* (2013.01); *G03B 21/2033* (2013.01)

(56) References Cited

FOREIGN PATENT DOCUMENTS

| CN | 102053382 A | 5/2011 |
| CN | 103232163 A | 8/2013 |
| CN | 106277806 A | 1/2017 |

OTHER PUBLICATIONS

Office Action issued in corresponding Chinese Application No. 201711260758, dated Feb. 3, 2020 according to Global Dossier, with English machine translation.

* cited by examiner

BEAM COHERENCE ELIMINATING ELEMENT

FIELD OF THE INVENTION

The invention relates to a beam coherence eliminating element, and specifically, to random alternation of beam phase by using crystal phase in a microcrystalline material which constitutes the element.

BACKGROUND OF THE INVENTION

Laser has the advantages of high brightness, good collimation, and good monochromaticity, etc., and is applied in various fields, such as communication, detection, industrial processing, sensing, and display, etc. In recent years, with the development of projection display and virtual reality, laser as a light source has become the main trend in the field of scanning imaging display system and laser projection imaging display system. Laser as a light source can achieve display on large screen, with high brightness, and with full color gamut. The integrated system also has the advantages of small size, light weight, low power consumption, high display quality and no electromagnetic radiation, etc.

However, when the laser is used as light source, there is a defect that is not ignorable, that is, laser speckles are formed when the laser irradiates on a rough object surface. Laser speckle streaks on the laser projection display screen severely affect the imaging quality on the screen, reduce the definition, resolution and contrast of image, and also form irregular color flicker on the screen, which easily causes eye fatigue. Therefore, eliminating or reducing speckle is one of the key technologies in laser projection display. The reasons for this phenomenon are mainly due to the coherence of the laser in addition to the image speckle caused by the optical system itself. Therefore, decoherence technology is the focus of research in the laser display industry.

At present, several typical decoherence technologies include rotating phase plate method, rotating or vibrating transmission fiber method, and vibrating screen method. Dynamic vibration method is utilized to reduce the coherence of laser. Such devices are relatively complicated and needed to be calibrated after long-term operation, so that it is difficult for maintenance and the cost is high. A static laser decoherence technology is disclosed in Patent 200910083485.4 in which it discloses the use of special refractive index distribution optical fiber, which is specifically characterized in that multiple areas with uneven refractive index, with a size of 1-1000 um and in a shape of circle, ellipse or square are distributed inside the fiber core. The optical path difference is changed by light scattering, so that the phase distribution of laser light at the exit terminal of the fiber is relatively random. The method using optical fiber modulation has low noises and a long life. However, it is very difficult to prepare such optical fiber using current optical fiber preparation technology. The particle size cannot be controlled accurately and the number of regions with uneven refractive index and their distribution inside the fiber core are not controllable, so that the direct result is to influence the phase change via optical fiber. Patent CN2629056Y discloses a coherence eliminating laser beam expander, which uses emulsified microcrystalline glass balls, ellipsoidal reflector, reflectors, collimating lens and other devices to irregularly reflect and refract the laser, thereby eliminating laser interference. However, on the one hand, since the device uses emulsified microcrystalline glass balls which change the forward direction of laser beam, the laser beam is emitted from all directions of the emulsified microcrystalline glass balls, so that it is necessary to add ellipsoidal reflector, reflectors and collimating lens and other optical elements to re-adjust the beam into a collimated light beam. Therefore, the device has a complicated structure with a large size. On the other hand, since the emulsified microcrystalline glass is used, the beam transmission efficiency is reduced. Therefore, the coherence eliminating laser beam expander has the disadvantages such as complicated structure, poor transmission efficiency and so on.

SUMMARY OF THE INVENTION

In view of the above problems, the present invention provides a beam coherence eliminating element.

The optical media material of the component comprises microcrystalline glass, and can also comprise other common optical media materials, including glass, crystal, and plastic.

The microcrystalline glass is a composite material in which a crystal phase and a glass phase exist simultaneously.

In an internal structure of the crystal phase in the microcrystalline glass, particles are arranged in order, while in an internal structure of the glass phase, particles are arranged in remote disorder.

The crystal phase and glass phase in the microcrystalline glass have different refractive indices of light beam.

The microcrystalline particles of crystal phase have a size of 0.1-1000 nm, and the distribution of the microcrystalline particles is random.

When multiple beams pass through the crystals in the microcrystalline glass, the crystals in the microcrystalline glass can randomly change beam phase without changing the overall transmission direction of the beams, thereby avoiding interference of the beams, i.e., eliminating the beam coherence.

The measurement of the size of crystal phase particles in the microcrystalline glass comprises X-ray diffraction, Debye-Scherrer calculation, transmission electron microscope observation, and scanning electron microscope observation.

The microcrystalline glass comprises one of the following microcrystalline glass or any combinations thereof: oxyfluoride microcrystalline glass, yttrium aluminum garnet microcrystalline glass, quantum dot-doped microcrystalline glass, transition ion-doped microcrystalline glass, silicate microcrystalline glass, aluminum silicate microcrystalline glass, borate microcrystalline glass, phosphate microcrystalline glass, calcium iron ore type microcrystalline glass and perovskite type microcrystalline glass.

When the size of microcrystalline in crystal phase of microcrystalline glass of the element is less than 800 nm, since the size of crystal in the microcrystalline glass is small, the crystal has little scattering effect on the beam, and mainly plays a role of randomly changing the phase.

When the size of microcrystalline in crystal phase of microcrystalline glass of the element is 800-1000 nm, it can change beam phase randomly, and also has an uniformization effect on the beam.

The microcrystalline glass of the element has a smooth and flat surface or a smooth and flat interface with other optical media materials. The microcrystalline glass is transparent microcrystalline glass and do not affect the overall transmission direction, thereby ensuring transmission efficiency of the beam.

The preparation of the microcrystalline glass comprises the following steps:

Step 1) selecting a raw material required for making microcrystalline glass, grinding and fully mixing the material, thereby obtaining a mixture;

Step 2) melting the mixture at a melting temperature which is higher than the melting point temperature of the microcrystalline glass material, and maintaining the mixture in a melting state;

Step 3) shaping the molten glass liquid; Step 4) annealing: annealing the glass liquid to eliminate internal stress, wherein a temperature for annealing is lower than a temperature for heat treatment;

Step 5) heat treating at a temperature for heat treatment which is the crystallization peak temperature of the glass, and keeping said temperature for heat treatment until the crystals are formed; Step 6) subjecting the microcrystalline glass to subsequent treatment, which comprises cutting, polishing, pickling and cleaning;

or it comprises the following steps:

Step 1) selecting a raw material required for making microcrystalline glass, grinding and fully mixing the material, thereby obtaining a mixture;

Step 2) melting the mixture at a melting temperature which is higher than the melting point temperature of the microcrystalline glass material, and maintaining the mixture in a melting state;

Step 3) shaping the molten glass liquid;

Step 4) annealing: annealing the glass liquid to eliminate internal stress, wherein a temperature for annealing is lower than a temperature for heat treatment;

Step 5) optical fiber processing: subjecting the glass to a treatment which comprises cutting, polishing, pickling and cleaning; then putting the glass into an optical fiber cladding material to obtain a preformed-rod; and finally drawing the preformed-rod at a temperature higher than the melting point of the glass, thereby obtaining an optical fiber;

Step 6) heat treating at a temperature for heat treatment which is the crystallization peak temperature of the glass, and keeping said temperature for heat treatment until the crystals are formed.

In Step 3), the shaping comprises pouring the glass liquid obtained in Step 2) into a pre-prepared mold for the element (or element mold), and pressing it into a specific shape.

Before the molten glass liquid having a high temperature is poured, the element mold is preheated, so that the temperature of the element mold reaches the maintaining temperature for the glass liquid.

The microcrystalline glass can be subjected to undoping, doping with quantum dot, doping with transition ion or doping with rare earth ion. In other words, the microcrystalline glass can be doped with quantum dot, transition ion, or rare earth ion.

The doping operation comprises adding a doping substance into the raw material of step 1), so as to confer or modulate one or more performances including light emitting performance, light amplification performance, light wavelength selection performance and frequency doubling performance.

The light beam whose coherence is eliminated by the element comprises monochromatic light.

The light source for producing the beam comprises laser light source, LED light source, krypton light source, helium light source, neon light source, hydrogen light source, mercury light source and any combination thereof.

The element comprises optical fiber, optical fiber connector, lens, parallel glass, glass brick, prism and any combination thereof.

The optical fiber mainly comprises a cladding (5), a core (3) and a protective layer (6); wherein the core (3) is located inside the optical fiber, and the cladding (5) surrounds the core (3), the protective layer (6) is located at the outer surface of the cladding (5), and the cladding (5) is a glass with a high melting point; and the material of the core (3) comprises a microcrystalline glass.

The light beam whose coherence is eliminated comprises laser.

The use method of the present invention is as follows:

In the transmission path of a beam, one or more elements of the present invention are added, or one or more common elements in the transmission path of the beam are replaced by the elements of the present invention. For example, in the transmission of the beam, one makes a beam pass through a glass brick containing the specific microcrystalline glass component of the present invention, or replaces an optical fiber originally used for beam transmission with a fiber containing the specific microcrystalline glass component of the present invention. When more beams pass through the crystals in the microcrystalline glass, the crystals in the microcrystalline glass randomly change the phase of beam without alternation of the overall transmission direction of beam, thereby avoiding the interference of beam, i.e., achieving an effect of decoherence.

The element of the present invention is useful for decoherence in the optical path of a laser television or projector.

In laser TV or projector, its light path is as follows: the three primary color laser light sources are used as display light sources, i.e., red laser light, green laser light and blue laser light are emitted by the red laser light source, the green laser light source and the blue laser light source respectively, while the elements of present invention are adopted for decoherence of red laser light, green laser light and blue laser light (that is, the beam coherence eliminating elements of the present invention are added at any position in the transmission path of the red laser, green laser and blue laser); the three lasers are subjected to beam expansion, shimming and decoherence, and are then modulated by diaphragm and signal modulation system, and finally pass through the X prism and the projection lens, so that the three primary color laser light beams are combined and projected onto a projection screen.

The signal modulation system controls the diaphragm, so as to control the intensity and combination of the three primary colors of laser light, thereby displaying images and colors.

When the element of the present invention is used in laser television or projector, the element comprises optical fiber, optical fiber connector, parallel glass, reflector, X prism, concave lens, and convex lens.

The invention has the advantages such as simple structure, convenient use, simplified manufacture, low cost, high beam transmission efficiency, etc. Further, the size and number of crystal particles can be controlled by controlling the heat treatment time and temperature for the microcrystalline glass, thereby controlling the performance of the element of the present invention.

EMBODIMENTS FOR CARRYING OUT THE INVENTION

The present invention will be further illustrated below with reference to the specific examples. It should be understood that these examples are only to illustrate the invention but not to limit the scope of the invention.

Example 1

Figure 1:
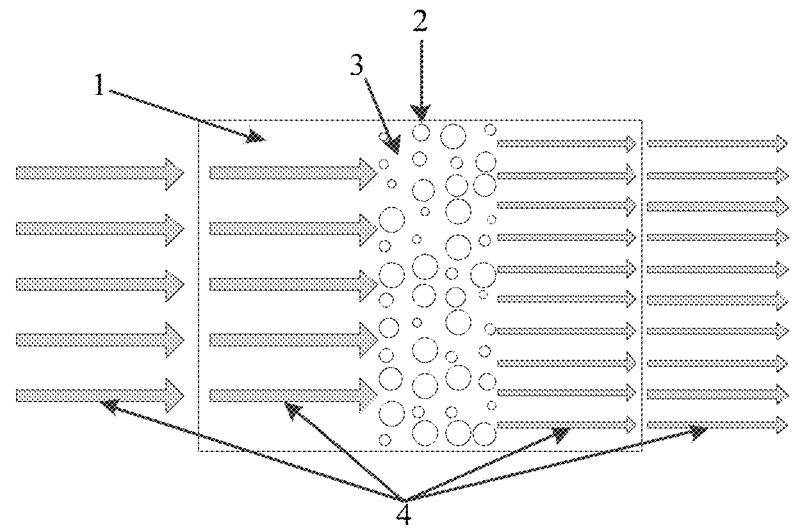
FIG. 1 shows a schematic diagram of an optical path of the beam coherence eliminating element of the present invention.

FIG. 1 shows a schematic diagram of an optical path according to an embodiment of the present invention. 1 is a common optical medium, such as glass, crystal, plastic, etc., wherein a part of the optical medium is replaced by a microcrystalline glass material; 2 is a micro-crystal in microcrystalline glass with random size and random position; 3 is a glass phase in microcrystalline glass; 4 shows the transmission of a light beam. When the beams pass through the microcrystalline glass, since the beams in different paths pass through different crystals, a random optical path difference is generated, so the phase is randomly changed and the coherence is destroyed.

Figure 2:
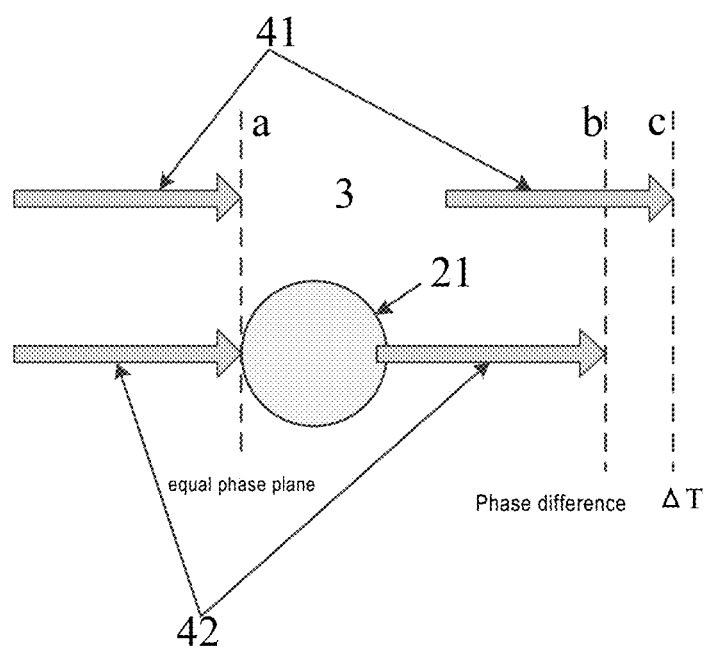
FIG. 2 shows a schematic diagram of the principle of beam phase alternation.

FIG. 2 shows a diagram of the principle of optical path difference which is generated when the beams pass through the crystal and do not pass through the crystal, wherein 21 is a micro crystal in the crystallized glass, 3 is the glass phase part in the microcrystalline glass, and 41 is a beam that does not pass through the micro crystal 21 in the transmission, 42 is another beam that passes through the micro crystal 21 in the transmission. The phase of the beam 41 and the beam 42 are equal at the position of the dotted line a, and the optical path difference is zero. That is, the dotted line a represents an equal phase plane of the beam 41 and the beam 42. When the beam 41 and the beam 42 continue their transmission, the beam 41 does not passed through the microcrystalline crystal 21 and the beam 42 passes through the microcrystalline crystal 21, so a phase difference ΔT is generated. Therefore, after the beams pass through the crystallized glass, since the beams in different paths pass through different crystals, a random optical path difference is generated, so that the phase is randomly changed and the coherence is destroyed.

Example 2

Figure 3:
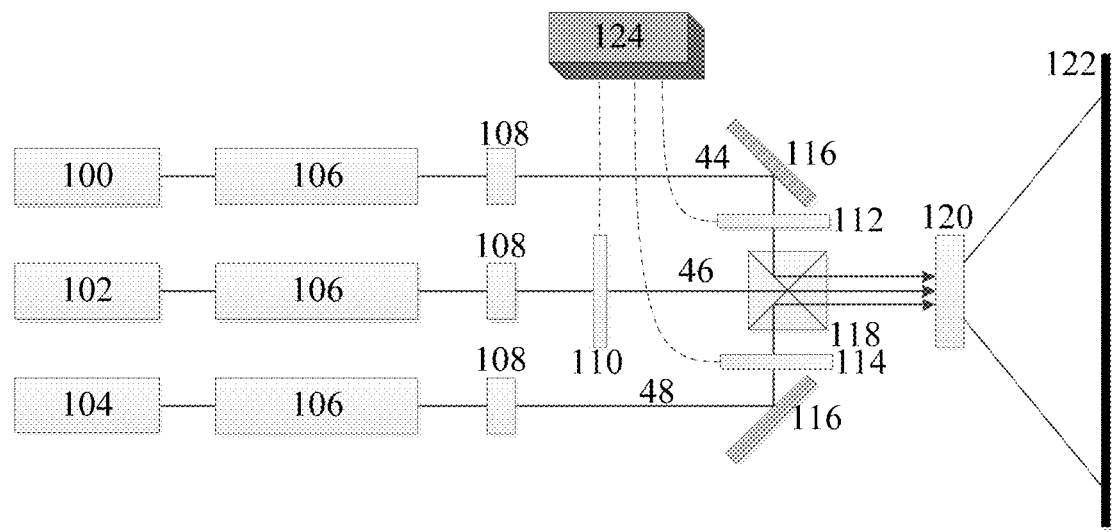
FIG. 3 shows a schematic diagram of the application of the element of the present invention in a laser TV or projector.

Example 2 is an application of the coherence eliminating element of the present invention in laser display technology, and the schematic diagram of optical path is shown in FIG. 3. In FIGS. 3, 100, 102 and 104 represent the red laser light source, green laser light source and blue laser light source, respectively; 106 is the beam expansion and shimming optical path system; 108 is the beam coherence eliminating element of the present invention; 110, 112 and 114 are green light diaphragm, red light diaphragm and blue light diaphragm, respectively; 116 is a reflector, 118 is an X prism, 120 is a projection lens, 122 is a projection screen, 124 is a signal modulation system which controls the green light diaphragm 110, the red diaphragm 112 and the blue diaphragm 114; 44 represents the red laser emitted from the red laser light source 100, 46 represents the green laser emitted from the green laser light source 102, 48 represents the blue laser emitted from the blue laser light source 104; and the arrow direction represents the light direction of the red laser, green laser or blue laser.

Red laser 44, green laser 46 and blue laser 48 are respectively subjected to beam expanding and shimming via 106, are subjected to decoherence via 108, are modulated via signal modulation system 124 and green diaphragm 110, red diaphragm 112 and blue diaphragm 114, are reflected via the reflector 116 and the X prism 118, then enter into the projection lens 120 and are finally projected onto the projection screen 122.

In another embodiment, the red laser 44, the green laser 46 and the blue laser 48 can be subjected to decoherence via 108 and then are subjected to beam expansion and shimming via 106.

The material for making coherence eliminating element 108 comprises microcrystalline glass, which comprises oxyfluoride microcrystalline glass, yttrium aluminum garnet microcrystalline glass, quantum dot-doped microcrystalline glass, transition ion-doped microcrystalline glass, silicate microcrystalline glass, aluminum silicate microcrystalline glass, borate microcrystalline glass, phosphate microcrystalline glass, calcium iron ore type microcrystalline glass, perovskite type microcrystalline glass and any combination thereof. The microcrystalline glass can also be other microcrystalline glass materials.

Laser TV and laser projectors have many competitive advantages such as large screen, high brightness, small size and portability, relatively low cost and long service life. The coherence eliminating element using microcrystalline glass of the present invention can be perfectly combined with laser TVs and laser projectors, and has advantages of small size, simple structure, convenient assembly, etc. The present invention has good potential application in laser TVs and laser projectors based on advantages such as microcrystalline glass has a low cost, high laser transmission efficiency, high mechanical strength, low expansion coefficient, good chemical and thermal stability, etc.

Example 3

Figure 4:
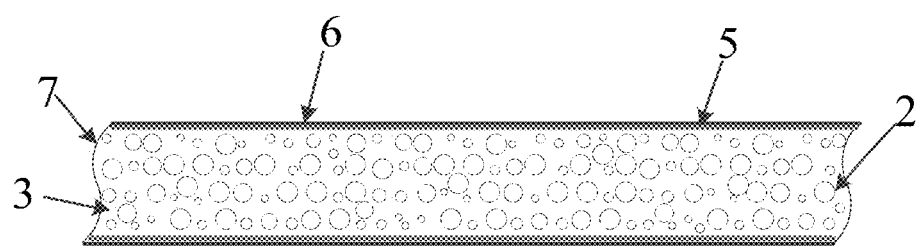
FIG. 4 shows a schematic diagram of the optical fiber structure of the present invention.

As the third Example of the present invention, as shown in FIG. 4, it is an optical fiber with a microcrystalline glass core. The optical fiber comprises a cladding 5, a protective layer 6 and a microcrystalline glass core 7. The cladding 5 is a glass with a high melting point, such as quartz glass material or silicate glass material, etc. The softening temperature of the cladding 5 is higher than the melting temperature of the microcrystalline glass core 7. The cladding 5 surrounds the outside of the microcrystalline glass core 7. The protective layer 6 is to enhance the mechanical strength and bending toughness of the entire optical fiber, and a method comprising curing after resin coating can be adopted. The refractive index of the glass material of the microcrystalline glass core 7 of the optical fiber is higher than that of the cladding 5 material. The microcrystalline glass core 7 had a glass phase 3 and crystals 2 with a random size and position, which can randomly change the phase of the beam.

The preparation steps for the microcrystalline glass core 7 of the optical fiber are as follows:
1) preparing a precursor glass;
2) melting and maintaining, wherein the melting temperature is higher than the melting point temperature of the microcrystalline glass core 7
3)) shaping: pouring the glass liquid into a preheated mold quickly and pressing it into a large glass block;

4) annealing: annealing the large glass block to eliminate internal stress wherein the annealing temperature is slightly lower than the heat treatment temperature.

5) optical fiber processing: cold processing the large glass block into thin cylindrical glass rods; cutting, polishing, pickling and cleaning the rods, and then putting a rod into a glass tube with one end sealed which is made of the cladding material to obtain a preformed-rod. The preformed-rod is heated to a temperature higher than the melting point of the core glass and drawn, wherein there is no crystallization, and the transmittance of the optical fiber to the visible beam is improved as much as possible;

6) heating treatment: the heating treatment temperature is controlled near the crystallization peak temperature of the core glass, and said temperature is maintained until the crystals are formed. According to the extent of laser decoherence, the heat treatment time and the extend of formation of the crystal 2 in the optical fiber microcrystalline glass core 7 are adjusted, so as to meet the actual use. If the time is short, then the formed crystals have a small size and a small amount, and can only change the phase; if the time is long, then formed crystals have a large size and a large amount, and can change the phase and uniform (or homogenize) flare simultaneously.

Example 4

Yttrium aluminum garnet microcrystalline glass was used. Yttrium aluminum garnet ($Y_3Al_5O_{12}$ (YAG)) is an important and common microcrystalline glass base material, which belongs to cubic crystal system and has garnet crystal structure, isotropy and no birefringence. The yttrium aluminum garnet microcrystalline glass material has excellent impact resistance, high temperature resistance, good optical homogeneity and high light damage threshold, and has no color center, no crack and no destroy in the process of high power laser. Since $Y^{3+}$ ion in the YAG crystal has a dodecahedral lattice environment, and the ion radius of $Y^{3+}$ is similar to other rare earths, so it can be replaced by trivalent rare earth ions to provide a good crystal field luminescence environment. Therefore, the YAG crystal doped with rare earth ions has a high luminous efficiency and is one of the most widely used laser gain media. In the embodiment, since luminous characteristic of the microcrystalline glass was not concerned, doping was not performed. In application, doping could be performed according to actual needs.

In the preparation, firstly, high temperature melting method was used to melt the material and maintaining the temperature. Then, shaping, annealing and heat treatment were carried out to obtain YAG microcrystalline glass. Finally, the subsequent treatment was carried out. The molar ratio of raw materials was $11SiO_2$-$6Al_2O_3$-$5CaO$-$3Y_2O_3$. 100 g of raw material was grinded, mixed thoroughly for 30 minutes, and poured into a high-purity corundum crucible to melt.

a) After the material was melted and maintained at 1600° C. for 1 h, the glass liquid was quickly poured into a pre-heated element mold, and pressed to form a plane lens. Finally, YAG microcrystalline glass was obtained by natural cooling. The crystal phase in the microcrystalline glass was homogenous, and the crystal size was 800-1000 nm.

b) After the material was melted and maintained at 1650° C. for 1 h, the glass liquid was quickly poured into a pre-heated element mold, and pressed to form a plane lens, then annealed in a 900° C. annealing furnace for 3 hours, and then the glass was treated at 1020° C. for 2 h to obtain the desired microcrystalline glass. The XRD (X-ray diffraction) pattern of the YAG microcrystalline glass of the element showed some sharp crystal diffraction peaks, and these diffraction peaks corresponded well to the diffraction pattern of the cubic YAG crystal. Among them, the main diffraction peak positions corresponded to the (211), (400), (420), (532), (640), and (642) crystal planes of the cubic YAG crystal, respectively, indicating that YAG crystals were formed in the glass after heat treatment. The strongest peak (420) was used to calculate the grain size by using the Scheler formula, and the average size of the crystals in the microcrystalline glass was about 21 nm. The microcrystalline glass was grinded and transmission electron microscopy test was conducted. The crystal particle size was between 15-40 nm, and the number of the crystal particle was also less than that in the microcrystalline glass obtained in Method a).

The plane lens element of YAG microcrystalline glass could be prepared by cutting, polishing, pickling and cleaning the plane lens prepared in method a) or b). Since the crystal particles size and number of YAG microcrystalline glass prepared in b) were smaller than those in the YAG microcrystalline glass prepared in a), the plane lens element prepared in b) had better light transmittance and smaller scattering effect on the beam, and mainly played a role of changing the beam phase. The YAG microcrystalline glass prepared in a) could change the beam phase and also homogenize the beam simultaneously.

The microcrystalline glass lens element prepared in Example 4 had both high light transmittance of glass and strong crystal field characteristics of crystal. Moreover, YAG microcrystalline glass had low preparation cost and good processability. If it was drawn into optical fiber, large-scale production could be achieved.

Example 5

In Example 4, some doping transition elements, such as Ce—Yb, were added into the raw materials, and the molar ratio of the raw material formula was: $44SiO_2$-$24Al_2O_3$-$20CaO$-$12Y_2O_3$-$0.1Ce_2O_3$-$1Yb_2O_3$, the other preparing steps were the same and the transition ion $Ce^{3+}$—$Yb^{3+}$ doped YAG microcrystalline glass element were prepared.

Under the excitation of sunlight, $Ce^{3+}$—$Yb^{3+}$ doped YAG microcrystalline glass element could excite near infrared, so it could be used in a solar pump laser to realize the spectral conversion from sunlight to near-infrared.

Example 6

In Example 4, some doping transition elements, Cr—Yb were added into the raw material, and the molar ratio of the raw material formula was: $44SiO_2$-$24Al_2O_3$-$20CaO$-$12Y_2O_3$-$0.1Cr_2O_3$-$1Yb_2O_3$. The other preparing steps were the same and the transition ion $Cr^{3+}$—$Yb^{3+}$ doped YAG microcrystalline glass elements were prepared.

Under the excitation of sunlight, $Cr^{3+}$—$Yb^{3+}$ doped YAG microcrystalline glass elements could excite near infrared, so it could be used in a solar pump laser to realize the spectral conversion from sunlight to near infrared luminescence.

Example 7

Borate microcrystalline glass is a kind of microcrystalline glass with corrosion resistance, adjustable expansion coefficient, good sealing performance and designable properties.

It can be doped to prepare strong magnetic materials, quantum dot-doped microcrystalline glass, luminescent microcrystalline glass, etc.

Similar to YAG microcrystalline glass, the preparation method of borate microcrystalline glass comprised: firstly, the high-temperature melting method was used to melt the material and maintain the molten material; then shaping, annealing, and finally heating treatment were conducted to obtain borate microcrystalline glass. The molar ratio of the raw material was $50B_2O_3$-$7Al_2O_3$-$15ZnO$-$15K_2O$-$10Li_2O$. 100 g of the raw material was weighed, grinded and mixed fully for 30 minutes, then poured into a high-purity corundum crucible, the crucible was sealed and placed in a silicon-carbon rod electric furnace to melt the material and maintain at 900° C. for 1 hour. Then the glass liquid was quickly poured into a pre-heated element mold and pressed to form a plane lens, which was then annealed in the annealing furnace at 400° C. for 3 h, and finally the glass was annealed in the annealing furnace at 450° C. for 5-10 hours. The borate microcrystalline glass plane lens element was prepared by cutting, polishing, pickling and cleaning the obtained plane lens.

The prepared microcrystalline glass plane lens element had superior light transmission performance, and still had high transmittance in the near infrared band. TEM (transmission electron microscopy) analysis of the microcrystalline glass showed that the crystal particles in the borate microcrystalline glass were uniform and the size was between 0.1-10 nm. The scattering effect on the beam was very small, the main effect is to change the phase of beam.

The borate microcrystalline glass in Example 7 had the characteristics of convenient cleaning and maintenance, hard and wear-resistant, outstanding weather resistance, simple process, low cost, etc. Especially, shaping could performed during melting the material and maintaining the molten material, so it was easy to form it into various arcs, curved panels and other shapes as required, with excellent machinability.

Example 8

PbS doping substance was added into the raw materials of Example 7 to prepare PbS quantum dot microcrystalline glass. The molar ratio of the raw material formula was: $50B_2O_3$-$7Al_2O_3$-$15ZnO$-$15K_2O$-$10Li_2O$-$1.0PbO$-$2.0ZnS$. The other preparing steps were the same, then PbS quantum dot-doped microcrystalline glass elements were prepared.

In the obtained PbS quantum dot-doped microcrystalline glass element, the crystal diameter of the PbS nanomicrocrystal in the microcrystalline glass was about 3-8 nm. Under the excitation of 450 nm light, the microcrystalline glass could detect wide band near-infrared luminescence. If the heat treatment temperature was changed, and its near-infrared emission spectrum was also changed. It was expected to be used in broad band tunable luminescence excited by sunlight.

Example 9

$Ba_2TiSi_2O_8$ microcrystalline glass with silicate glass as the matrix was used. The content of network exosome ($TiO_2$ and $BaO$) in the glass component was high, the content of network former ($SiO_2$) was relatively low, and the amount of network intermediates ($Al_2O_3$) added was very rare to avoid affecting the formation of nonlinear crystal.

Similar to Example 4 and Example 7, the preparation method of silicate microcrystalline glass comprised: firstly, the high-temperature melting method was used to melt the material and maintain the molten material; then shaping, annealing, and finally heating treatment were conducted to obtain silicate microcrystalline glass. The molar ratio of the glass formula used was $45SiO_2$-$3Al_2O_3$-$16BaO$-$17TiO_2$. 100 g of the raw material was weighed, grinded and mixed fully for 30 minutes, then poured into a platinum-rhodium crucible, the crucible was sealed and placed in a high-temperature silicon-molybdenum rod electric furnace to melt the material and hold at 1600° C. for 1 hour. Then the glass liquid was quickly poured into a pre-heated element mold and pressed to form a plane lens, which was then annealed in the annealing furnace at 500° C. for 2 h, and finally annealed in the annealing furnace at 650° C. for 3-8 hours. The silicate microcrystalline glass plane lens elements were prepared by cutting, polishing, pickling and cleaning the obtained plane lens.

The TEM analysis of the microcrystalline glass of the element showed that the size of crystal particles distributed in the glass matrix was 2 nm-15 nm. The crystal size was very small, and the light-scattering of the microcrystalline glass plane lens element was also very small.

$Ba_2TiSi_2O_8$ crystal had good dielectric properties and nonlinear optical properties, which had always been research focus. $Ba_2TiSi_2O_8$ microcrystalline glass had very large second-order nonlinear coefficient which was equivalent to that of $LiNbO_3$. The optical fiber using $Ba_2TiSi_2O_8$ microcrystalline glass as matrix material was expected to realize the second harmonic effect in the optical fiber, also known as the second frequency doubling effect, so it was possible to perform frequency conversion on the intense pulse light in an all optical fiber network, and such conversion did not depend on the frequency of the initial light.

Example 10

The silicon germanate glass system glass was used, and network exosome in the glass was MgO. The molar ratio of the raw materials used was $10SiO_2$-$6GeO_2$-$3MgO$. 100 g of the raw material was weighed, grinded and mixed fully for 30 minutes, then poured into a high-purity corundum crucible, the crucible was sealed and placed in a high-temperature silicon-molybdenum rod electric furnace to melt the material and hold at 1680° C. for 1 hour. Then the glass liquid was quickly poured into a pre-heated element mold and pressed to form a plane lens, which was then annealed in the annealing furnace at 500° C. for 2 h, and finally heat-treated in the annealing furnace at 600° C. for 1-3 hours. The silicon germanate microcrystalline glass plane lens elements were prepared by cutting, polishing, pickling and cleaning the obtained plane lens.

The TEM analysis of the microcrystalline glass of the element showed that the size of crystal particles distributed in the glass matrix was 0.2 nm-10 nm. The crystal size was very small, and the light-scattering of the microcrystalline glass plane lens element was also very small.

Example 11

Oxyfluoride glass system glass was used, and the molar ratio of the raw material was $20SiO_2$-$5Al_2O_3$-$8PbF_2$. 100 g of the raw material was weighed, grinded and mixed fully for 30 minutes, then poured into a high-purity corundum crucible, the crucible was sealed and placed in a high-temperature silicon-molybdenum rod electric furnace to melt the material and hold at 1100° C. for 1 hour. Then the glass liquid was quickly poured into a pre-heated element mold and pressed to form a plane lens, which was then annealed in the annealing furnace at 400° C. for 1 h, and finally heat-treated in the annealing furnace at 480° C. for 0.1-1 hours. The oxyfluoride microcrystalline glass plane lens elements were prepared by cutting, polishing, pickling and cleaning the obtained plane lens.

The TEM analysis of the microcrystalline glass of the element showed that the size of crystal particles distributed in the glass matrix was 2-20 nm. The crystal size was very small, and the light-scattering of the microcrystalline glass plane lens element was also very small.

Example 12

The aluminosilicate microcrystalline glass was prepared, and the molar ratio of raw materials used was $10SiO_2$-$2Al_2O_3$-$2CaO$-$3MgO$. Three raw materials (each material was 100 g), were denoted as material a, b, and c. Each material was weighed grinded and mixed fully for 30 minutes, then poured into a high-purity aluminum crucible, the crucible was sealed and placed in a high-temperature silicon-molybdenum rod electric furnace to melt the material and hold at 1400° C. for 2 h. Then the glass liquid was quickly poured into a pre-heated element mold and pressed to form a plane lens. Finally, the two aliquots of glass liquids were a) annealed in annealing furnace at 770° C. for 1.5 h, treated in annealing furnace at 890° C. for 0.1-1 h; b) annealed in annealing furnace at 790° C. for 1.5 h, treated in annealing furnace at 930° C. for 0.1-1 h; c) annealed in annealing furnace at 790° C. for 1.5 h, treated in annealing furnace at 950° C. for 0.1-1 h, respectively. The aluminosilicate microcrystalline glass plane lens elements were prepared by cutting, polishing, pickling and cleaning the obtained plane lens.

The TEM analysis of the microcrystalline glass of the element showed that the size of crystal particles distributed in the glass matrix was a) about 500-800 nm; b) 10-80 nm; c) 200-400 nm. The size of crystal particles of sample b was very small, and microcrystalline glass plane lens element had the smallest light scattering, mainly changed the phase of the beam, and had the highest transmittance of the beam; the crystal particles of sample a had large size, could change the beam phase and homogenize the beam simultaneously.

Example 13

Phosphate microcrystalline glass was prepared, and the molar ratio of the raw materials was $43SiO_2$-$22Al_2O_3$-$18NaCO_3$-$3NaF$-$10YF_3$-$4P_2O_5$. 100 g of the raw material was weighed, grinded and mixed fully for 30 minutes, then poured into a high-purity corundum crucible, the crucible was sealed and placed in high-temperature silicon-molybdenum rod electric furnace to melt the material and hold at 1450° C. for 1 hour. Then the glass liquid was quickly poured into a pre-heated element mold and pressed to form a plane lens, which was then annealed in the annealing furnace at 500° C. for 2 h, and finally heat-treated in the annealing furnace at 650° C. for 0.1-2 hours. The phosphate microcrystalline glass plane lens elements were prepared by cutting, polishing, pickling and cleaning the obtained plane lens.

The TEM analysis of the microcrystalline glass of the element showed that the size of crystal particles distributed in the glass matrix was 2-20 nm. The crystal size was very small, and the light-scattering of the microcrystalline glass plane lens element was also very small.

The cost of phosphate microcrystalline glass was higher than other microcrystalline glass, and its chemical resistance was also poor. However, many phosphates had the advantages of biocompatibility and had been successfully implanted into organisms. Therefore, it had good application prospects in the field of biomedicine.

Example 14

Perovskite type microcrystalline glass was prepared, and the molar ratio of the raw materials was $26BaCO_3$-$8SrCO_3$-$29TiO_2$—$SiO_2$—$Al_2O_3$-$BaF_2$. 100 g of the raw material was weighed, grinded and mixed fully for 30 minutes, then poured into a high-purity corundum crucible, the crucible was sealed and placed in a high-temperature silicon-molybdenum rod electric furnace to melt the material and hold at 1550° C. for 1 hour. Then the glass liquid was quickly poured into a pre-heated element mold and pressed to form a plane lens, which was then annealed in the annealing furnace at 650° C. for 3 h, and finally heat-treated in the annealing furnace at 650° C. for 0.1-2 hours. The microcrystalline glass plane lens element was prepared by cutting, polishing, pickling and cleaning the obtained plane lens.

The TEM analysis of the microcrystalline glass of the element showed that the size of crystal particles distributed in the glass matrix was 1-15 nm. The crystal size was very small, and the light-scattering of the microcrystalline glass plane lens element was also very small.

Barium strontium titanate and its dopant perovskite microcrystalline glass had outstanding dielectric properties, and had a good application prospect in energy storage capacitors.

The invention claimed is:

1. A beam coherence eliminating element, which comprises at least an optical media material, wherein the optical media material at least comprises microcrystalline glass, and microcrystalline particles of crystal phase in the microcrystalline glass have a size of 0.1-1000 nm, and a distribution of the microcrystalline particles is random;
   when multiple beams pass through crystals in the microcrystalline glass, the crystals in the microcrystalline glass can randomly change beam phase without changing an overall transmission direction of the beams, thereby avoiding interference of the beams.

2. The beam coherence eliminating element of claim 1, wherein the microcrystalline glass comprises oxyfluoride microcrystalline glass, yttrium aluminum garnet microcrystalline glass, silicate microcrystalline glass, silicon germanate microcrystalline glass, aluminosilicate microcrystalline glass, borate microcrystalline glass, phosphate microcrystalline glass, calcium iron ore microcrystalline glass, perovskite type microcrystalline glass and any combination thereof.

3. The beam coherence eliminating element of claim 1, wherein the size of the microcrystalline particles of the crystal phase in the microcrystalline glass is 800-1000 nm.

4. The beam coherence eliminating element of claim 1, wherein the microcrystalline glass of the element has a smooth and flat surface or a smooth and flat interface with other optical media materials.

5. The beam coherence eliminating element of claim 2, wherein preparation of the microcrystalline glass comprises the following steps:
   Step 1) selecting a raw material required for making the microcrystalline glass, grinding and fully mixing the raw material, thereby obtaining a mixture;

Step 2) melting the mixture at a melting temperature which is higher than a melting point temperature of a material of the microcrystalline glass, and maintaining the mixture in a melting state as a molten glass liquid;

Step 3) shaping the molten glass liquid;

Step 4) annealing the molten glass liquid to eliminate internal stress and thereby obtaining a glass, wherein a temperature for annealing is lower than a temperature for heat treatment;

Step 5) heat treating at a temperature for heat treatment which is a crystallization peak temperature of the glass, and keeping said temperature for heat treatment until the crystals are formed;

Step 6) subjecting the microcrystalline glass to subsequent treatment, which comprises cutting, polishing, pickling and cleaning;

or comprises the following steps:

Step 1) selecting a raw material required for making the microcrystalline glass, grinding and fully mixing the material, thereby obtaining a mixture;

Step 2) melting the mixture at a melting temperature which is higher than a melting point temperature of a material of the microcrystalline glass, and maintaining the mixture in a melting state to obtain a molten glass liquid;

Step 3) shaping the molten glass liquid;

Step 4) annealing the molten glass liquid to eliminate internal stress and thereby obtaining a glass, wherein a temperature for annealing is lower than a temperature for heat treatment;

Step 5) optical fiber processing: subjecting the glass to a treatment which comprises cutting, polishing, pickling and cleaning; then putting the glass into an optical fiber cladding material to obtain a preformed-rod; and finally drawing the preformed-rod at a temperature higher than melting point of the glass;

Step 6) heat treating at a temperature for heat treatment which is a crystallization peak temperature of the glass, and keeping said temperature for heat treatment until the crystals are formed.

6. The beam coherence eliminating element of claim 2, wherein the microcrystalline glass is subjected to undoping, quantum dot doping, transition ion doping or rare earth ion doping.

7. The beam coherence eliminating element of claim 1, wherein a light source producing the beams comprises laser light source, LED light source, krypton light source, helium light source, neon light source, hydrogen light source, mercury light source and any combination thereof.

8. The beam coherence eliminating element of claim 1, wherein the element further comprises an optical fiber, an optical fiber connector, lens, a parallel glass, a glass brick, a prism and any combination thereof.

9. The beam coherence eliminating element of claim 8, wherein the optical fiber mainly comprises a cladding, a core and a protective layer;

wherein the core is located inside the optical fiber, and the cladding surrounds the core, the protective layer is located at an outer surface of the cladding, and the cladding is a glass with a high melting point; and a material of the core comprises a microcrystalline glass.

10. The beam coherence eliminating element claim 1, wherein the element is applied for decoherence in an optical path of a laser television or projector:

light path of the laser television or projector comprises a red laser light source, a green laser light source and a blue laser light source;

the red laser light source, the green laser light source and the blue laser light source emit red laser light, green laser light and blue laser light, respectively;

one or more beam coherence eliminating elements of claim 1 are added at any position in a transmission path of the red laser light, green laser light and blue laser light;

the red laser light, green laser light and blue laser light are subjected to beam expansion, shimming and decoherence, and then are modulated by a diaphragm and signal modulation system, and finally pass through a X prism and projection lens, and are projected onto a projection screen.

11. The beam coherence eliminating element of claim 1, wherein the beam comprises a monochromatic light or a laser.

12. A laser television or projector which comprises a beam coherence eliminating element of claim 1 in at least one optical path of the laser television or projector.

13. The laser television or projector of claim 12, wherein the element comprises an optical fiber, an optical fiber connector, a parallel glass, a reflector, a X prism, concave lens, and convex lens.

14. A method for preparing a beam coherence eliminating element of claim 1, which comprises the following steps:

Step 1) selecting a raw material required for making the microcrystalline glass, grinding and fully mixing the raw material, thereby obtaining a mixture;

Step 2) melting the mixture at a melting temperature which is higher than a melting point temperature of a material of the microcrystalline glass, and maintaining the mixture in a melting state to obtain a molten glass liquid;

Step 3) shaping the molten glass liquid;

Step 4) annealing: annealing the molten glass liquid to eliminate internal stress and thereby obtaining a glass, wherein a temperature for annealing is lower than a temperature for heat treatment;

Step 5) heat treating at a temperature for heat treatment which is a crystallization peak temperature of the glass, and keeping said temperature for heat treatment until the crystals are formed;

Step 6) subjecting the microcrystalline glass to subsequent treatment, which comprises cutting, polishing, pickling and cleaning;

or comprises the following steps:

Step 1) selecting a raw material required for making the microcrystalline glass, grinding and fully mixing the material, thereby obtaining a mixture;

Step 2) melting the mixture at a melting temperature which is higher than a melting point temperature of a material of the microcrystalline glass, and maintaining the mixture in a melting state to obtain a molten glass liquid;

Step 3) shaping the molten glass liquid;

Step 4) annealing the molten glass liquid to eliminate internal stress and thereby obtaining a glass, wherein a temperature for annealing is lower than a temperature for heat treatment;

Step 5) optical fiber processing: subjecting the glass to a treatment which comprises cutting, polishing, pickling and cleaning; then putting the glass into an optical fiber cladding material to obtain a preformed-rod; and finally drawing the preformed-rod at a temperature higher than a melting point of the glass;

Step 6) heat treating at a temperature for heat treatment which is a crystallization peak temperature of the glass, and keeping said temperature for heat treatment until the crystals are formed.

15. The method of claim 14, wherein the shaping step comprises pouring the molten glass liquid obtained in the melting step into a pre-prepared element mold, and pressing it into a specific shape.

16. The method of claim 15, wherein before the molten glass liquid is poured, the element mold is preheated, so that a temperature of the element mold reaches a maintaining temperature for the molten glass liquid.

17. The method of claim 14, wherein the method further comprises a doping operation which comprises adding a doping substance into the raw material of step 1), so as to confer or modulate one or more performances including a light emitting performance, a light amplification performance, a light wavelength selection performance and a frequency doubling performance.

* * * * *